(12) United States Patent
Mistry et al.

(10) Patent No.: US 12,459,325 B2
(45) Date of Patent: Nov. 4, 2025

(54) TRACTION-DEPENDENT VARIATION OF WHEEL-TO-SURFACE NORMAL FORCE

(71) Applicant: JAGUAR LAND ROVER LIMITED, Warwickshire (GB)

(72) Inventors: Anesh Mistry, Coventry (GB); Dennis Lausecker, Coventry (GB); Sam Brown, Coventry (GB); Syed Asad Ali, Coventry (GB); Luke Birch, Coventry (GB); William Burdock, Coventry (GB); James Kelly, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 142 days.

(21) Appl. No.: 18/254,403

(22) PCT Filed: Nov. 26, 2021

(86) PCT No.: PCT/EP2021/083089
§ 371 (c)(1),
(2) Date: May 25, 2023

(87) PCT Pub. No.: WO2022/112466
PCT Pub. Date: Jun. 2, 2022

(65) Prior Publication Data
US 2024/0109385 A1 Apr. 4, 2024

(30) Foreign Application Priority Data
Nov. 27, 2020 (GB) ..................................... 2018688

(51) Int. Cl.
*B60G 17/00* (2006.01)
*B60G 17/0165* (2006.01)
(Continued)

(52) U.S. Cl.
CPC ..... *B60G 17/0165* (2013.01); *B60G 17/0195* (2013.01); *B60W 10/18* (2013.01);
(Continued)

(58) Field of Classification Search
CPC ............ B60G 17/0165; B60G 17/0195; B60G 2400/208; B60G 2400/41; B60G 2400/91;
(Continued)

(56) References Cited

U.S. PATENT DOCUMENTS 5,517,414 A 5/1996 Hrovat
10,300,760 B1 * 5/2019 Aikin ..................... B60G 17/08
(Continued)

FOREIGN PATENT DOCUMENTS

| | | |
|---|---|---|
| DE | 102008003901 A1 | 7/2009 |
| EP | 1995091 A1 | 11/2008 |
| WO | 2015153811 A1 | 10/2015 |

OTHER PUBLICATIONS

International Search Report and Written Opinion of the International Searching Authority for International application No. PCT/EP2021/083089 dated Mar. 21, 2022.
(Continued)

*Primary Examiner* — Truc M Do
(74) *Attorney, Agent, or Firm* — Carlson, Gaskey & Olds, P.C.

(57) ABSTRACT

A control system (300) for controlling an active suspension system (104) of a vehicle (100), the control system comprising one or more controller (301), wherein the control system is configured to: obtain (908) information indicative of relative traction levels between different wheels (FL, FR, RL, RR) of the vehicle; and in dependence on the information, control (912) the active suspension system to increase normal force through a wheel (FR) of the vehicle having relatively high traction compared to one or more other (Continued)

wheels (FL, RL, RR) of the vehicle, and decrease normal force through a wheel (FL) of the vehicle having relatively low traction compared to one or more other wheels (FR, RL, RR) of the vehicle.

20 Claims, 6 Drawing Sheets

(51) Int. Cl.
| | |
|---|---|
| *B60G 17/0195* | (2006.01) |
| *B60W 10/18* | (2012.01) |
| *B60W 10/20* | (2006.01) |
| *B60W 10/22* | (2006.01) |

(52) U.S. Cl.
CPC ............ *B60W 10/20* (2013.01); *B60W 10/22* (2013.01); *B60G 2400/208* (2013.01); *B60G 2400/41* (2013.01); *B60G 2400/91* (2013.01); *B60G 2800/214* (2013.01); *B60W 2300/185* (2013.01); *B60W 2520/26* (2013.01); *B60W 2520/28* (2013.01); *B60W 2520/30* (2013.01); *B60W 2710/22* (2013.01)

(58) Field of Classification Search
CPC . B60G 2800/214; B60W 10/18; B60W 10/20; B60W 10/22; B60W 2300/185; B60W 2520/26; B60W 2520/28; B60W 2520/30; B60W 2710/22
See application file for complete search history.

(56) References Cited

U.S. PATENT DOCUMENTS

| | | | | |
|---|---|---|---|---|
| 2004/0267428 | A1* | 12/2004 | Knoop | B60W 30/02 340/440 |
| 2016/0023530 | A1* | 1/2016 | Guest | B60G 17/0165 701/38 |
| 2017/0137023 | A1* | 5/2017 | Anderson | B60G 17/0195 |

OTHER PUBLICATIONS

Combined Search and Examination Report under Sections 17 and 18(3) for Application No. GB2018688.8 dated Aug. 11, 2021.
Examination Report under Section 18(3) for Application No. GB2018688.8 dated Feb. 14, 2023.

* cited by examiner

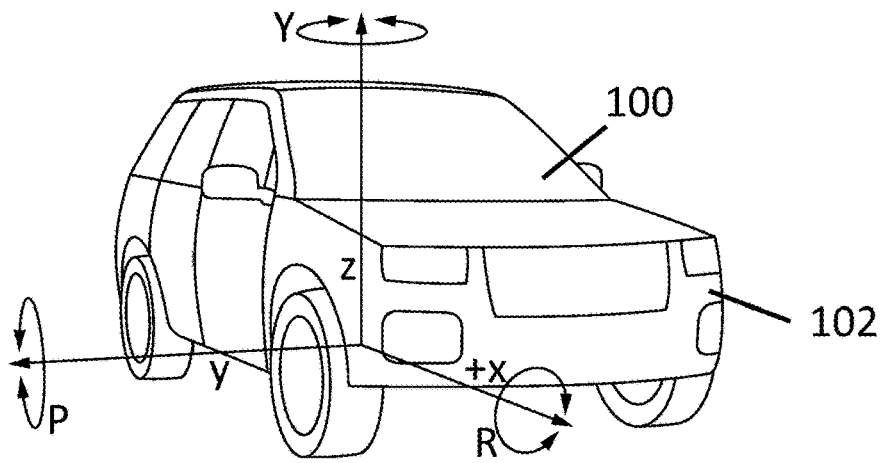
FIG. 1
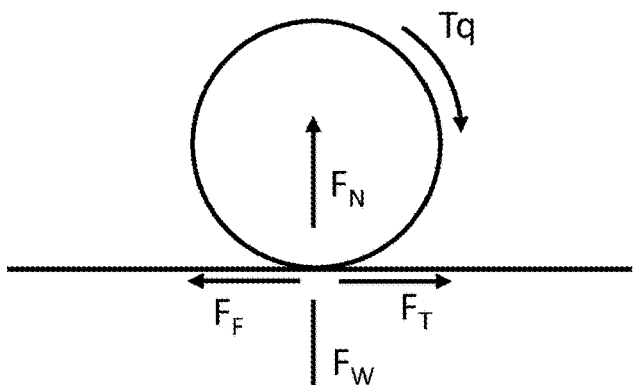
FIG. 2A
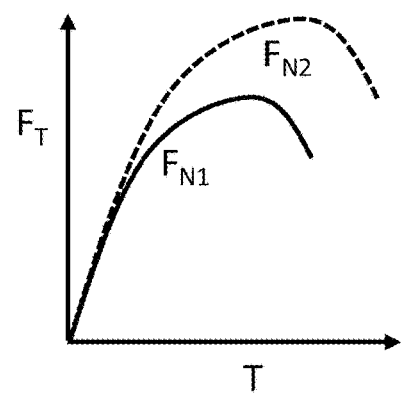
FIG. 2B
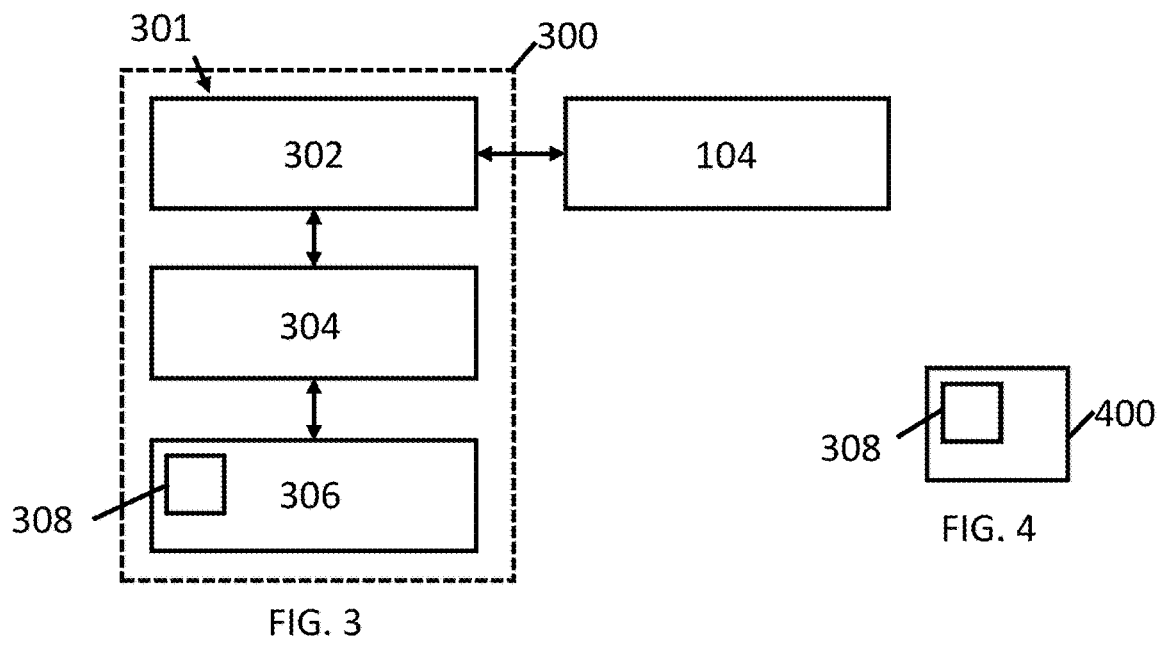
FIG. 3
FIG. 4

TRACTION-DEPENDENT VARIATION OF WHEEL-TO-SURFACE NORMAL FORCE

TECHNICAL FIELD

The present disclosure relates to traction-dependent variation of wheel-to-surface normal force. In particular, but not exclusively it relates to traction-dependent variation of wheel-to-surface normal force by an active suspension system of a vehicle.

BACKGROUND

If individual wheels of a vehicle are on surfaces that provide differing coefficients of friction p, options for maximizing traction are limited. Limited slip differentials or locking differentials are mechanisms that prevent or limit differential slip between wheels, to mitigate the loss of traction through the wheel-to-surface contact patch with the lowest p.

A traction control system can detect wheel slip and reduce the speed of the slipping wheel by applying brakes or reducing torque. Braking the slipping wheels will cause torque transfer to the wheels with greater traction due to mechanical action within the differential.

SUMMARY OF THE INVENTION

It is an aim of the present invention to address one or more of the disadvantages associated with the prior art.

According to an aspect of the invention there is provided a control system for controlling an active suspension system of a vehicle, the control system comprising one or more controller, wherein the control system is configured to: obtain information indicative of relative traction levels between different wheels of the vehicle; and in dependence on the information, control the active suspension system to increase normal force through a wheel of the vehicle having relatively high traction compared to one or more other wheels of the vehicle, and decrease normal force through a wheel of the vehicle having relatively low traction compared to one or more other wheels of the vehicle, for example compared to the relatively high traction wheel.

In some examples, the control system is configured to: receive an indication of a loss of traction of the vehicle; and obtain the information indicative of relative traction levels in response to the indication of the loss of traction.

In some examples, obtaining the information indicative of relative traction levels comprises: controlling the active suspension system to change normal force through a first subset of one or more wheels; determining a traction-dependent variable at each of the first subset of wheels to which known torque is applied; controlling the active suspension system to change normal force through second subset of one or more wheels; and determining a traction-dependent variable at each of the second subset of wheels to which known torque is applied, wherein the traction-dependent variables indicate relative traction levels.

In some examples, the traction-dependent variables comprise wheel speed.

In some examples, the first subset of wheels comprises a first pair of wheels at first diagonally-opposite corners of the vehicle, and wherein the second subset of wheels comprises a second pair of wheels at second diagonally-opposite corners of the vehicle.

In some examples, the first subset is a first wheel at a first corner of the vehicle, and wherein the second subset is a second wheel at a second adjacent corner of the vehicle.

In some examples, the first corner is at a first lateral side of the vehicle and at a first longitudinal end of the vehicle, and wherein the second corner is at a second lateral side of the vehicle and at the first longitudinal end.

In some examples, obtaining the information indicative of relative traction levels comprises:
controlling the active suspension system to change normal force through a third wheel at the second lateral side and at a second longitudinal end of the vehicle; determining a traction-dependent variable at the third wheel to which known torque is applied; controlling the active suspension system to change normal force through a fourth wheel, wherein the fourth wheel is at the first lateral side and at the second longitudinal end; and determining a traction-dependent variable at the fourth wheel to which known torque is applied, wherein the traction-dependent variables at the third and fourth wheels indicate relative traction levels.

In some examples, changing normal force for obtaining the information indicative of relative traction levels comprises repetitively pulsing normal force through the first subset of wheels at a first phase and through the second subset of wheels at a second phase.

In some examples, changing normal force for obtaining the information indicative of relative traction levels comprises repetitively pulsing normal force at a rate between approximately 0.25 Hz and approximately 15 Hz.

In some examples, controlling the active suspension system in dependence on the information indicative of relative traction levels comprises increasing normal force through wheels at first diagonally-opposite corners of the vehicle, including the wheel having relatively high traction and decreasing normal force through wheels at second diagonally-opposite corners of the vehicle, including the wheel having relatively low traction.

In some examples, the increase of normal force comprises a steady state increase of normal force.

In some examples, the control system is configured to repetitively pulse normal force through one or more wheels at a frequency having a first value from the range approximately 8 Hz to approximately 15 Hz and/or a second value from the range approximately 0.25 Hz to approximately 3 Hz.

In some examples, controlling the active suspension system in dependence on the information indicative of relative traction levels is continued until an indication of a loss of traction of the vehicle is no longer received or is below a threshold.

In some examples, the control system is configured to control a torque source and/or braking to rotate wheels of the vehicle at different speeds and/or rates of change in dependence on the information indicative of relative traction levels.

In some examples, the control system is configured to vary a steering angle at one or more steerable wheels in dependence on the information indicative of relative traction levels.

In some examples, the control system is configured to receive surface information, and in dependence on the surface information: enable the obtaining of information indicative of relative traction levels; enable the control of the active suspension system in dependence on the information indicative of relative traction levels; and/or determine one or more pulsation characteristics for the control of the active suspension system.

In some examples, the surface information is dependent on one or more of: a selected terrain mode of the vehicle; and information obtained from one or more sensors.

According to a further aspect of the invention there is provided an active suspension system comprising the control system.

According to a further aspect of the invention there is provided a vehicle comprising the control system or the active suspension system.

According to a further aspect of the invention there is provided a method of controlling an active suspension system of a vehicle, the method comprising: obtaining information indicative of relative traction levels between different wheels of the vehicle; and in dependence on the information, controlling the active suspension system to increase normal force through a wheel of the vehicle having relatively high traction compared to one or more other wheels of the vehicle and decrease normal force through a wheel of the vehicle having relatively low traction compared to one or more other wheels of the vehicle.

According to a further aspect of the invention there is provided computer software that, when executed, is arranged to perform the method. According to a further aspect of the invention there is provided a non-transitory computer readable medium comprising computer readable instructions that, when executed by a processor, cause performance of any one or more of the methods described herein.

The one or more controller may collectively comprise: at least one electronic processor having an electrical input for receiving information; and at least one electronic memory device electrically coupled to the at least one electronic processor and having instructions stored therein; and wherein the at least one electronic processor is configured to access the at least one memory device and execute the instructions thereon so as to cause the control system to cause performance of the method.

Within the scope of this application it is expressly intended that the various aspects, embodiments, examples and alternatives set out in the preceding paragraphs, in the claims and/or in the following description and drawings, and in particular the individual features thereof, may be taken independently or in any combination that falls within the scope of the appended claims. That is, all embodiments and/or features of any embodiment can be combined in any way and/or combination that falls within the scope of the appended claims, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 1 illustrates an example vehicle and a coordinate system;

FIGS. 2A, 2B illustrate forces acting on a wheel and a road;

FIG. 3 illustrates an example control system;

FIG. 4 illustrates an example of a non-transitory computer-readable storage medium;

DETAILED DESCRIPTION

Figure 5:
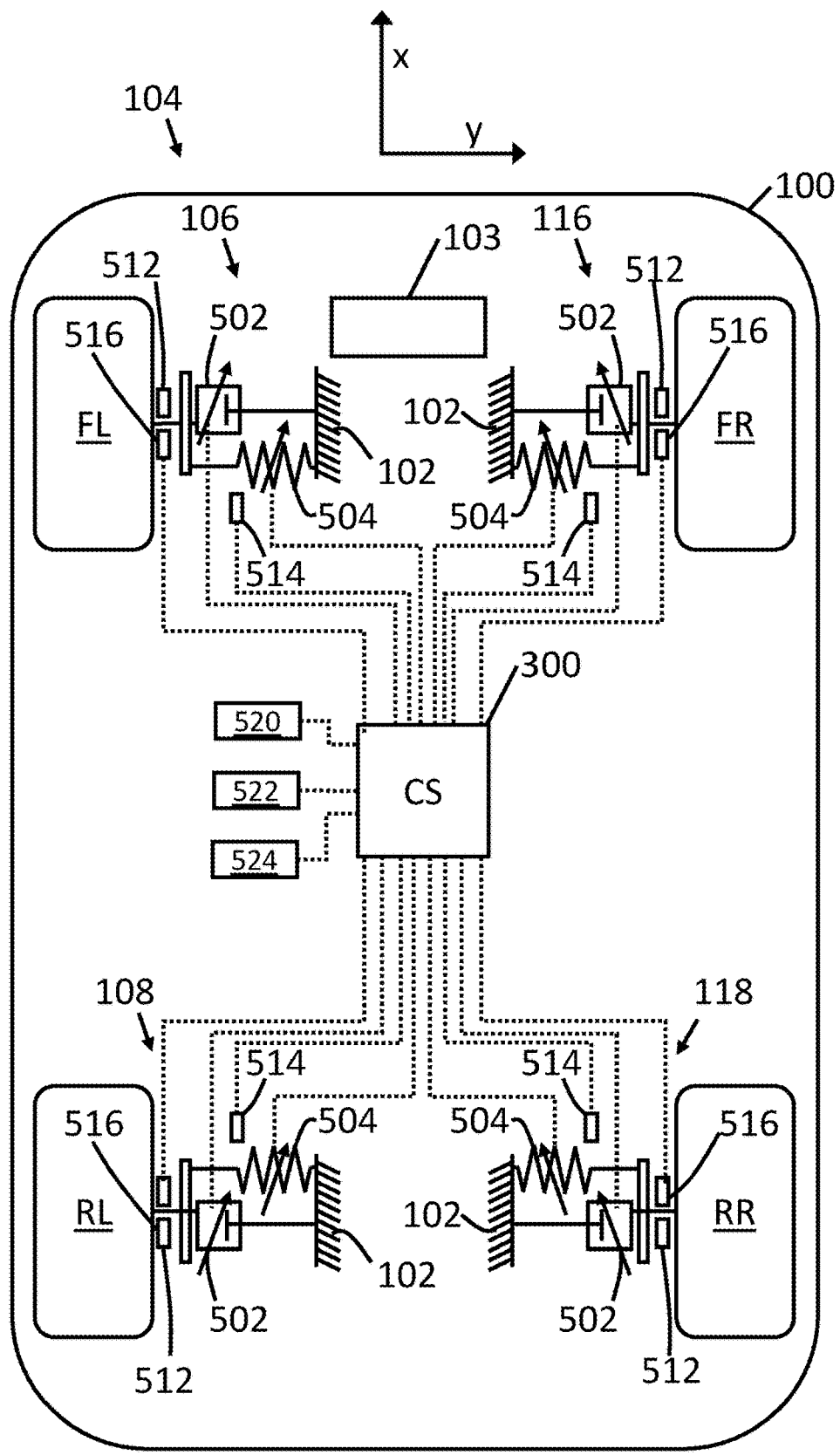
FIG. 5 illustrates an example of an active suspension system of a vehicle.

FIG. 1 illustrates an example of a vehicle 100 in which embodiments of the invention can be implemented. In some, but not necessarily all examples, the vehicle 100 is a passenger vehicle, also referred to as a passenger car or as an automobile. In other examples, embodiments of the invention can be implemented for other applications, such as industrial or commercial vehicles. The vehicle 100 has a vehicle body 102 (sprung mass) supported by a suspension.

FIG. 1 also illustrates a coordinate system. The x-axis is the longitudinal axis. A vehicle body rotation 'R' about the x-axis is roll. The y-axis is the lateral axis. A vehicle body rotation 'P' about the y-axis is pitch. The z-axis is the vertical axis. A vehicle body rotation 'Y' about the z-axis is yaw.

FIG. 2A schematically illustrates a wheel and a road surface, and forces acting on the wheel and on the road. $F_T$ is tractive force which depends on torque Tq applied by a torque source such as an internal combustion engine or electric machine, and depends on usable traction. $F_F$ is friction force. $F_W$ is the weight of the vehicle 100 supported by that wheel, referred to as corner weight if the vehicle 100 has one wheel at each corner. $F_N$ is the normal force equal and opposite to the weight $F_W$. Normal force is also referred to as wheel-to-surface contact patch force herein.

FIG. 2B is a graph with tractive force Fr on the y-axis and applied torque Tq on the x-axis. The solid line in FIG. 2B illustrates for a given normal force $F_{N1}$ the tractive force Fr increases proportionally to applied torque Tq up to a usable traction limit. Above the limit, a further increase of torque Tq will provide less additional tractive force $F_T$ due to onset of wheel slip. With increasing torque and therefore wheel slip rate, the tractive force $F_T$ will start to fall because dynamic friction is less than static friction.

However, if the normal force increases to $F_{N2}$ (dashed line) the usable traction limit increases. Therefore, if during driving the normal force $F_N$ could be increased by increasing the proportion of vehicle weight applied to that wheel, the consequent increase of usable traction can help the vehicle 100 to maintain traction or get unstuck.

In at least some embodiments of the invention, the suspension of the vehicle 100 is an active suspension system able to momentarily increase the normal force $F_N$ through particular wheels of the vehicle 100, to increase traction at those wheels. An active suspension system 104 is a system to which energy can be supplied under the control of a control system 300 such as the one shown in FIG. 3, so as to vary the normal force at the wheels of the vehicle. By adding energy to increase actuator force (the force for increasing wheel-to-body distance) at a corner of the vehicle 100 relative to other corners, the weight balance of the vehicle 100 shifts so that more of its weight is supported by some wheels than others. If more weight can be applied to driven wheels with highest traction, those wheels will have even more usable traction due to the consequent increases in normal force $F_N$.

Therefore, the weight of the vehicle 100 can be thought of as a 'currency' that can be used to manage a normal force applied to each tyre at the contact patches where increasing the proportion of vehicle weight supported by a given wheel will give maximum return in terms of tractive force for the vehicle as a whole. If a control system 300 is able to measure traction µ at each contact patch, the ideal weight change for each wheel can be calculated. For example, information of which contact patch has highest traction µ can be used to provide additional normal force to that contact patch resulting in greater tractive force. Similarly, the information of which contact patch has lowest p could be used to unweight that contact patch by reducing the normal force through it, which frees up additional 'mass currency' for use on the contact patch with the highest traction µ.

The above concept is referred to herein as 'traction finder', and can be employed to keep the vehicle 100 moving or to help a stuck vehicle 100 to become unstuck without the need of external assistance.

An active suspension system 104 and the control system 300 will first be described.

The control system 300 of FIG. 3 comprises a controller 301. In other examples, the control system 300 may comprise a plurality of controllers on-board and/or off-board the vehicle 100. In some examples, a control system 300 or a controller 301 may be supplied as part of an active suspension system 104.

The controller 301 of FIG. 3 includes at least one processor 304; and at least one memory device 306 electrically coupled to the electronic processor 304 and having instructions 308 (e.g. a computer program) stored therein, the at least one memory device 306 and the instructions 308 configured to, with the at least one processor 304, cause any one or more of the methods described herein to be performed. The processor 304 may have an interface 302 such as an electrical input/output I/O or electrical input for receiving information and interacting with external components such as the active suspension system 104.

FIG. 4 illustrates a non-transitory computer-readable storage medium 400 comprising the instructions 308 (computer software). FIG. 5 illustrates an example implementation of the active suspension system 104. The active suspension system 104 comprises front left active suspension 106 for a front left wheel FL, front right active suspension 116 for a front right wheel FR, rear left active suspension 108 for a rear left wheel RL, and rear right active suspension 118 for a rear right wheel RR. The active suspension for each wheel (e.g. quarter/corner) of the vehicle 100 may be individually controllable.

FIG. 5 also shows a torque source 103 such as an internal combustion engine or electric machine, for driving at least some of the vehicle wheels.

The active suspension for each corner of the vehicle 100 comprises an actuator 502. The actuator 502 may be a hydraulic actuator such as a hydraulic fluid-filled chamber containing a piston. One end of the actuator 502 is coupled to a vehicle wheel and the other end is coupled to the vehicle body 102. A spring 504 (e.g. coil or pneumatic) may be in equilibrium and acting in parallel with the actuator 502.

When the vehicle suspension is undisturbed, the piston of the hydraulic actuator 502 sits at a particular neutral position in the chamber. The piston can move in either direction inside the chamber, e.g. due to a road disturbance compressing the actuator 502. The piston can displace fluid out of the chamber into a hydraulic circuit (not shown). The fluid imparts a restoring force against movement of the piston. Energy can be added to and/or extracted from the actuator 502 by pumping fluid and/or controlling valves to regulate fluid pressure to either side of the piston.

Therefore, a control system 300 can dynamically control restoring force against the displaced piston. This force is equivalent to spring force of a coil spring against displacement. Dynamic control enables the force-displacement relationship to be changed to adapt to a driving scenario. Energy can be added or removed quickly, e.g. within tens of milliseconds. In order to control spring force, the control system 300 may output a force request that is dependent on sensed wheel travel (wheel-to-body displacement/articulation).

Dynamic damping characteristics of the actuator 502 can be modified by controlling a fluid valve at a constriction, which regulates the rate at which fluid is transferred in and out of the actuator 502 by movement of the piston.

Further, energy can be added to or removed from the actuator 502 in order to vary the normal force applied to the tyre contact patch associated with that actuator 505. This variation in force may result in an extension or retraction of the actuator 502. In FIG. 5 this enables the wheel-to-body distance to be changed independently at different ends and/or at different corners of the vehicle 100.

The above example refers to a hydraulic actuator 502, and in other embodiments the actuator may be an electromagnetic actuator or a pneumatic actuator, or the like.

In FIG. 5 but not necessarily all examples, the spring 504 comprises an active spring such as a pneumatic spring, enabling control of ride height. The control system 300 may be configured to pump gas (e.g. air) in or out of the pneumatic spring 504 to control ride height. An air-levelling function of the control system 300 seeks to maintain a set ride height irrespective of vehicle load and achieves this by modifying the volume of air and therefore air pressure to maintain the set ride height.

Energy can be added to or removed from the pneumatic spring 504 in order to increase or decrease the volume of the pneumatic spring 504. Increasing the volume can lift the vehicle body 102 in the z-axis. In FIG. 5 this enables the wheel-to-body distance to be changed independently at different ends and/or at different corners of the vehicle 100. Additionally or alternatively, the spring 504 comprises a passive spring (e.g. coil) or is omitted entirely.

Control of the active suspension system 104 relies on one or more sensors. Wheel travel may be sensed by a wheel-to-body displacement sensor 514 (suspension displacement-based sensor), for example. The wheel-to-body displacement sensor 514 is placed somewhere on the active suspension and can sense the position of the wheel along an arc defined by suspension geometry. An example of a wheel-to-body displacement sensor 514 is a rotary potentiometer attached to a lever, wherein one end of the lever is coupled to the vehicle body 102, and the other end is coupled to a suspension link.

In some examples, the control system 300 more accurately determines the wheel travel and/or its associated derivatives by fusing information from the wheel-to-body displacement sensor 514 with information from hub accelerometers.

Pressure in the pneumatic spring 504 can be sensed to indicate weight onto the wheel.

In at least some examples the control system 300 is configured to control the active suspension system 104 by transmitting a force request to the active suspension or to a low-level controller thereof. The force request may be an arbitrated force request based on requests from various requestors and information from various sensors.

FIG. 5 illustrates additional optional features that may interact with the control system 300 to influence force request calculation. These include any one or more of:

A wheel speed sensor 512 for each wheel. In an example implementation, the wheel speed sensor 512 is part of an antilock braking system (ABS).

A hub-mounted accelerometer 516 for each wheel, coupled to the unsprung mass of the vehicle 100.

A human-machine interface (HMI) 520. This refers to any of the various input devices and input/output devices available to the driver such as touchscreens, displays, hardware switches/sliders/selectors or the like.

At least one vehicle body accelerometer 522 coupled to the vehicle body 102 (sprung mass). A particular example includes a 3DOF or 6DOF inertial measurement unit (IMU). A unit may comprise an accelerometer or a multi-axis set of accelerometers.

A tyre pressure monitoring system (TPMS) 524 comprising tyre pressure monitors for each wheel.

FIGS. 6A-9 illustrate example implementations for traction finder:

FIGS. 6A-7E illustrate examples of an estimation function that determines relative traction levels, for example which wheels (corners/contact patches) have the most grip (traction). The estimation function controls the active suspension system to change (e.g. pulse/oscillate) the normal force and measure the effect of the change on a traction indicator such as wheel speed (spin).

FIGS. 8A-8E illustrate examples of an implementation function that increases normal force through the wheel or wheels having the highest traction determined by the estimation function. The implementation function may comprise a steady state suspension deflection and/or may comprise a pulsing/oscillating component for reasons explained later.

Figure 9:
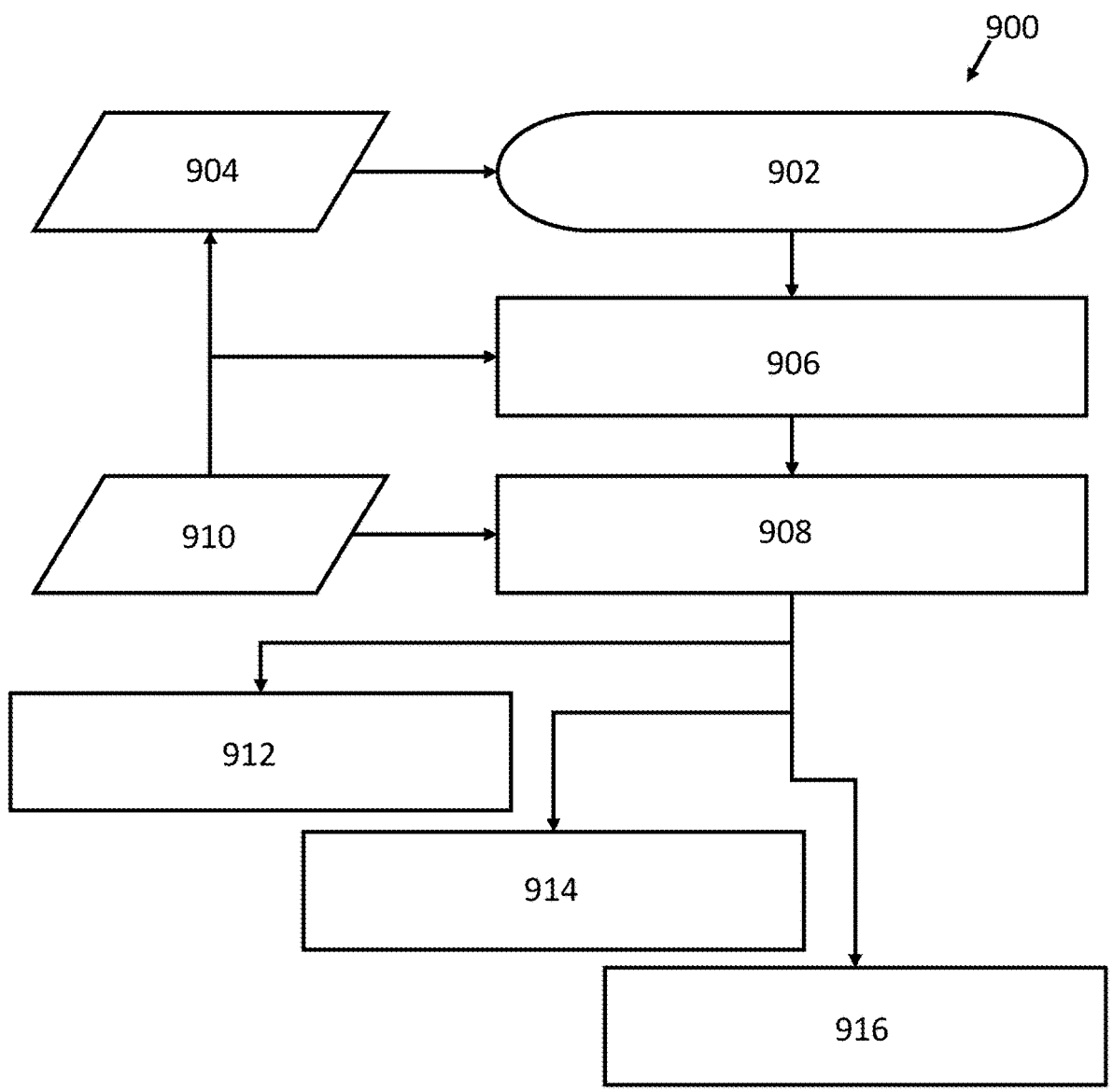
FIG. 9 illustrates an example method.

FIG. 9 illustrates an example control method.

The estimation function is described first with reference to various embodiments.

A first technique for estimating relative traction levels is based on detected wheel slip from the wheel speed sensors 512. If a first wheel is spinning at a higher speed than others, for example faster than the average of the wheel speeds, then the first wheel likely has lower traction after other variables have been accounted for. Other variables include, for example a known torque split between wheels, and known different powertrain losses to different wheels.

Wheel slip-based traction estimation can detect which wheel or wheels have low traction, which enables the methods of this disclosure to be implemented. However, traction finder would be even more effective if the wheel(s) with the highest traction are identifiable. FIGS. 6A-7E provide embodiments that enable the wheel(s) with highest traction to be identified, by modifying the weight balance of the vehicle 100 to obtain information indicative of relative traction levels. This comprises:

controlling the active suspension system 104 to change normal force (e.g. oscillating actuator extension and retraction) through a first subset of one or more wheels;

determining a traction-dependent variable (e.g. wheel speed) at each of the first subset of wheels to which known torque (e.g. measured constant or variable torque request) is applied while changing normal force;

controlling the active suspension system 104 to change normal force (e.g. oscillating actuator extension and retraction) through second subset of one or more wheels; and determining a traction-dependent variable (e.g. wheel speed) at each of the second subset of wheels to which known torque (e.g. measured constant or variable torque request) is applied while changing normal force.

The control system 300 can then evaluate the effect of a known change (known actuator force request) of normal force on the wheel speed. If the change of normal force causes the wheel to slip at a different speed or transition between slipping and not slipping (break traction or regain traction), the wheel speed will change relative to the other wheel speeds in a manner that indicates the usable traction of that wheel.

The exact traction does not necessarily need to be known, as long as the relative traction levels of different wheels are ascertainable. For example, the control system 300 could rank the wheel traction levels between best and worst based on how their wheel speeds were affected. Methods include, but are not limited to comparing average wheel speeds or maximum wheel speeds of each wheel.

There are various ways in which the normal force could be changed to enable the relative traction estimation. The change could be:

a steady state decrease by lifting a wheel towards the vehicle body 102;

a steady state increase by pushing a wheel away from the vehicle body 102; or oscillation (pulsing) between decreasing and increasing, as illustrated in FIGS. 6A-7E which will now be described.

Figure 6A:
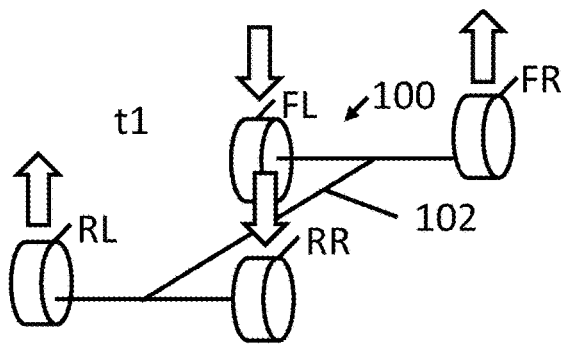
FIGS. 6A, 6B, 6C illustrate an example of diagonal out-of-phase normal force variation for estimating relative traction levels.
Figure 6B:
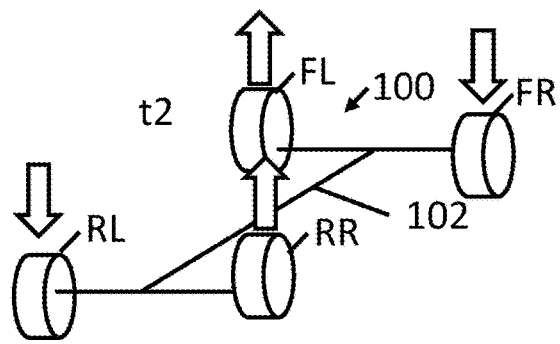
Figure 6C:
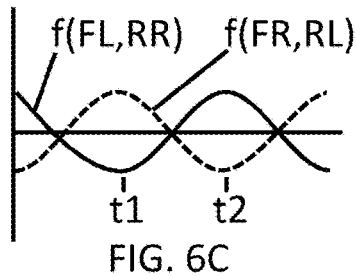

FIGS. 6A-6C illustrate a first example of the actuator-based traction estimation. FIGS. 6A, 6B are schematic illustrations of the vehicle wheels FL, FR, RL, RR and vehicle body 102 at different times.

In this example, actuators 502 are controlled to vertically pulse a first subset (pair) of wheels at first diagonally-opposite corners of the vehicle 100 at a first phase, and a second subset (pair) of wheels at second diagonally-opposite corners of the vehicle 100 at a second phase, in this case approximately 180 degrees out of phase. Therefore, one wheel is lifted/pulled (unweighted/unloaded) while the other wheel is pushed (weighted/loaded).

FIG. 6A illustrates the state of the wheels at a first time t1, wherein the front right wheel FR and rear left wheel FL are pulled upwards as a diagonal pair while the front left wheel FL and rear right wheel RR are pushed downwards as a diagonal pair.

FIG. 6B illustrates the state of the wheels at a second time t2, wherein the front right wheel FR and rear left wheel FL are pushed downwards as a diagonal pair while the front left wheel FL and rear right wheel RR are pulled upwards as a diagonal pair.

In some, but not necessarily all examples the pattern is approximately sinusoidal for smoothness, as shown in the amplitude (A)-time (t) graph of FIG. 6C. In other examples the waveform is different or is a sequence of discontinuous pulses.

In some examples the pattern has a predetermined frequency. FIG. 6C shows that one diagonal pair of wheels FR, RL is pulsed at a first frequency f (FR, RL) and the other diagonal pair of wheels is pulsed at a frequency f (FL, RR)

which is approximately the same as the first frequency. However, it would be appreciated that the frequencies do not have to match.

FIG. 6C also shows that the waveforms are 180 degrees out of phase, so one pair of wheels is at maximum weighting/loading while the other pair of wheels is at maximum unweighting/unloading. It will be appreciated that whilst force is varied by the actuators 502, it is still desirable in many situations, to maintain tyre to surface contact at all corners. As such, the wheel-to-body displacement changes can be relatively small, which is advantageous as it tends not to cause uncomfortable disturbances in vehicle body motion or damage to the surface over which the vehicle is travelling.

In an example the frequency (first frequency) during estimation is at least approximately 0.25 Hz. The frequency can be no more than approximately 15 Hz.

The appropriate amplitude of oscillation is another parameter that can be controlled. At least if the vehicle 100 is moving, the frequency and amplitude may be controlled to be outside a wheel hop-inducing range. Therefore, the wheels remain in continuous contact with the ground.

The selection of diagonal pairs and a 180-degree phase offset together help to maintain vehicle body composure during the estimation, to minimize vehicle body roll or pitch.

The estimation may comprise measuring wheel slip (relative wheel speeds) to determine which diagonal pair has the most overall traction. The estimation may further comprise measuring the relative wheel speeds within each diagonal pair to identify the wheel with the best traction. The estimation may identify the wheel or subset of wheels with the best traction.

The estimation may be repeated for each oscillation/pulsation cycle. More than one pulsation improves confidence, for instance the confidence of an average wheel slip/average peak wheel slip. After a required number of pulsation cycles, the pulsation ends.

An alternative implementation of FIGS. 6A-6C is to push a first diagonal pair of wheels downward without pulling the other pair upward, and then push the other pair of wheels downward without pulling the first pair upward. That is, the estimations are performed consecutively rather than concurrently.

In another embodiment the lateral wheels FL, FR at opposite lateral sides of the vehicle 100 are pulsed consecutively or concurrently 180 degrees out-of-phase, and the wheels RL, RR at the other longitudinal end of the vehicle 100 are not pulsed. In a further embodiment the rear wheels RL, RR are pulsed but not the front wheels FL, FR, for instance if the vehicle 100 is configured for rear-wheel drive. In a further embodiment the vehicle 100 is rolled side to side or pitched up and down, by changing normal force at wheels concurrently or in an out-of-phase oscillating/pulsing pattern. The illustrated diagonal pattern is most advantageous for vehicle body composure.

FIGS. 7A-7E illustrate another estimation embodiment in which individual wheels are pulsed in a rotating gimballing pattern or sequence, either clockwise or anticlockwise, around the vehicle.

Figure 7A:
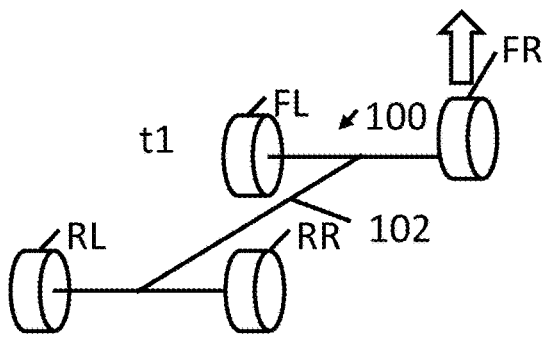
FIGS. 7A, 7B, 7C, 7D, 7E illustrate an example of 90-degree out-of-phase normal force variation for estimating relative traction levels.

In FIG. 7A at time t1 a first wheel FR is pulsed at a first phase, wherein the first wheel is at a first lateral side (right) of the vehicle 100 and at a first longitudinal end (front) of the vehicle 100.

Figure 7B:
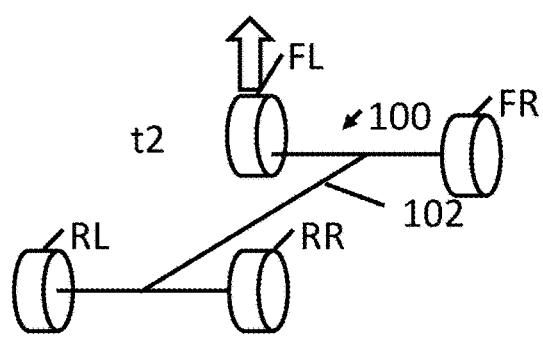

In FIG. 7B at time t2 a second wheel FL is pulsed at a second phase behind the first phase, wherein the second wheel is at a second lateral side (left) of the vehicle 100 and at the first longitudinal end (front).

Figure 7C:
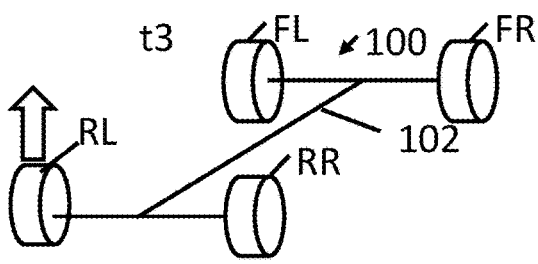

In FIG. 7C at time t3 a third wheel RL is pulsed at a third phase behind the second phase, wherein the third wheel is at the second lateral side (left) and at a second longitudinal end (rear) of the vehicle 100.

Figure 7D:
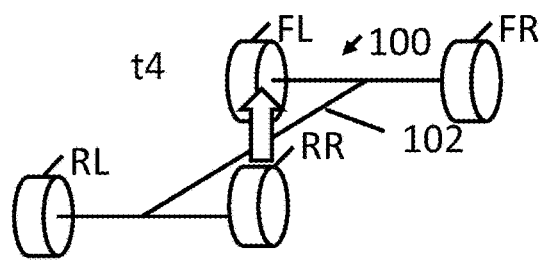

In FIG. 7D at time t4 a fourth wheel RR is pulsed at a fourth phase behind the third phase, wherein the fourth wheel is at the first lateral side (right) and at the second longitudinal end (rear).

Figure 7E:
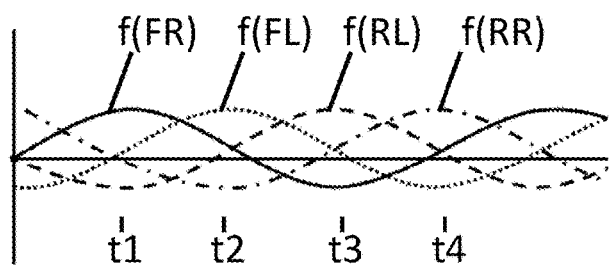

As shown in FIG. 7E, the first to fourth phases may be approximately 90 degrees behind each other to provide uniformly rotating contact patch force variation around the vehicle. The frequencies f(FR), f(FL), f(RL), f(RR) may be approximately the same frequency or frequencies as each other.

The gimballing motion helps to maintain vehicle body composure, so that vehicle body motion is neither pure roll nor pure pitch.

In an alternative embodiment the individual wheels are pulsed/displaced sequentially rather than concurrently out-of-phase. That is, the next wheel may be pulsed/displaced after the previous wheel has returned to its normal target position or target normal force.

The gimballing pattern enables wheel slip estimations to be performed for each pulsated wheel, and relative traction levels to be obtained.

Once estimation is complete, an implementation phase is entered in which the active suspension system 104 changes the weight balance of the vehicle 100 to shift a greater proportion of vehicle weight onto the wheel or wheels with highest traction. Examples of this implementation phase are provided with reference to FIGS. 8B-8E. In some, but not necessarily all examples the estimation process ceases when progressing to the implementation phase of FIGS. 8B-8E.

Figure 8A:
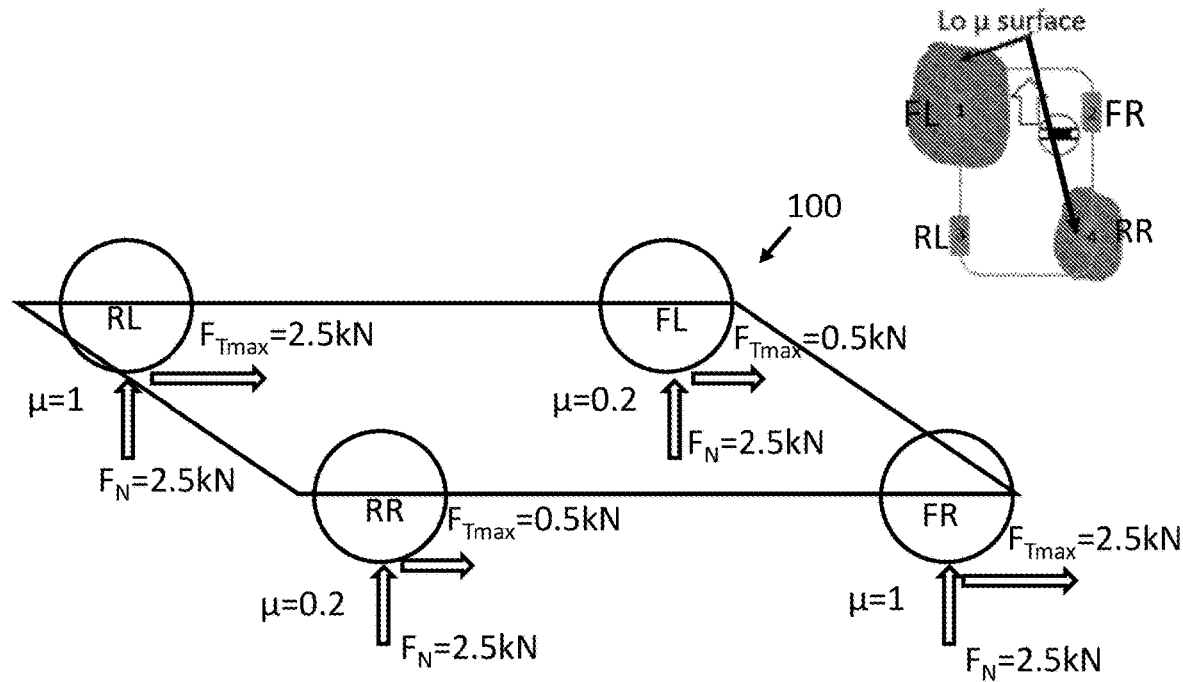
FIGS. 8A, 8B, 8C, 8D, 8E illustrate examples of increasing normal force through a wheel having relatively high traction.

First, FIG. 8A shows an example scenario in which embodiments of the invention are not applied. In FIG. 8A, wheel 1 (front left wheel FL) and wheel 4 (rear right wheel RR) are on low-$\mu$ surfaces having $\mu=0.2$, whereas wheel 2 (front right wheel FR) and wheel 3 (rear left wheel RL) are on high-$\mu$ surfaces having $\mu=1$.

Forces are shown assuming a vehicle mass of ~1000 kg and fully locked differentials. The total normal force is $F_N=10$ kN. The normal force $F_N$ at each corner is $F_N=2.5$ kN assuming equal weight to each corner. The maximum usable tractive force is $F_{Tmax}=\mu F_N=0.5$ kN for wheels FL and RR due to the low-$\mu$ surface. The maximum usable tractive force is $F_{Tmax}=\mu F_N=2.5$ kN for wheels FR and RL due to the high-$\mu$ surface. The total maximum usable tractive force for all wheels therefore adds up to $F_{Tmax}=6$ kN assuming fully locked differentials.

In this situation a fully locked or limited slip differential would result in excessive wheelspin of the low-$\mu$ wheels FL, RR. An open differential would result in the same torque to each wheel across the differential, not making full use of the maximum usable tractive force. However, as shown in FIG. 8B the control method of the present disclosure enables better use of the traction of wheels FR and RL.

Figure 8B:
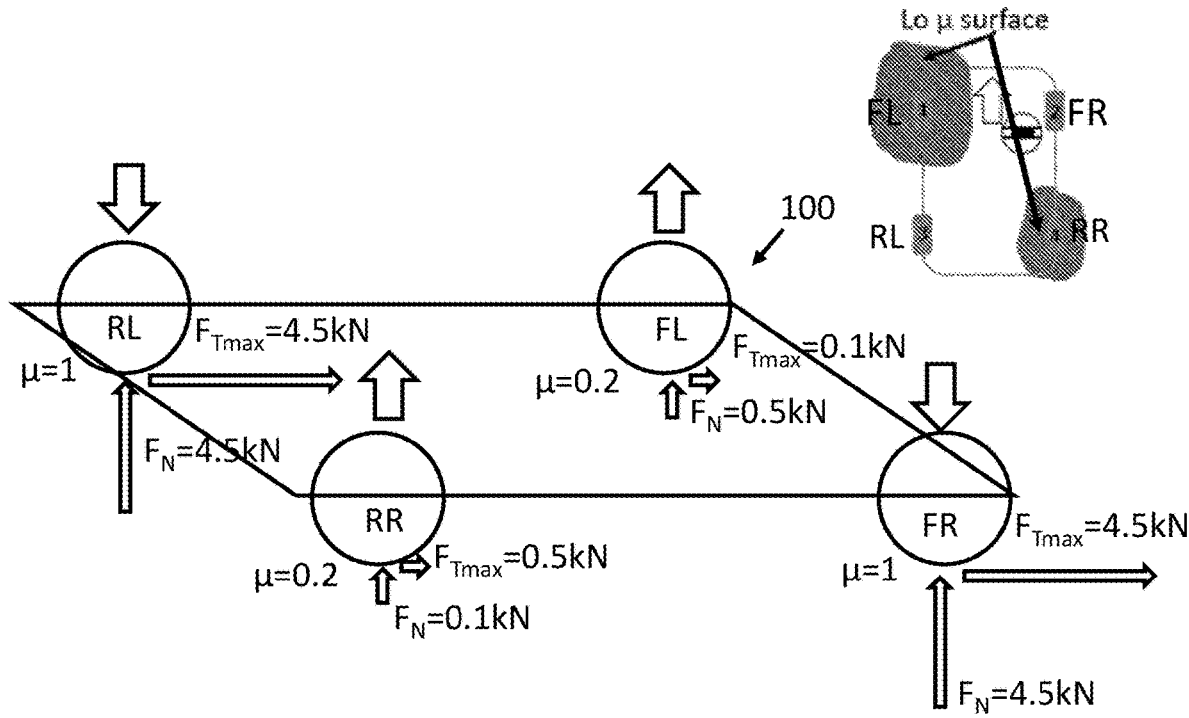

FIG. 8B shows that the weight distribution of the vehicle 100 has been shifted by controlling the active suspension system 104 to increase normal force through wheels determined to have relatively high traction while decreasing normal force through wheels determined to have relatively low traction.

This is achievable for example by actuators 502 pushing the high-traction wheel(s) FR, RL away from the vehicle body 102 and pulling the low-traction wheel(s) FL, RR towards the vehicle body 102.

The forces in FIG. 8B are now as follows. The normal force at the low-μ wheels FL, RR has been reduced to $F_N$=0.5 kN. The maximum usable tractive force of wheels FR, RR is therefore reduced to $F_{Tmax}$=μ$F_N$=0.1 kN. The normal force at the high-μ wheels FR, RL has been increased to $F_N$=4.5 kN. The maximum usable tractive force of wheels FR, RL has therefore increased to $F_{Tmax}$=μ$F_N$=4.5 kN. The total maximum usable tractive force for all wheels therefore adds up to $F_{Tmax}$=9 kN, greater than 6 kN as before.

If the highest traction wheel(s) were instead the front left and rear right wheels FL, RR, the wheels FL, RR would be pushed downward and the wheels FR, RL would be pulled upward.

The wheels within each pair may be pushed/pulled by the same amount as each other or by different amounts proportional to their individual traction levels.

In this situation, because the wheels are pulled and pushed in diagonal pairs, vehicle body composure is retained without excessive pitch or roll.

In another embodiment the high-μ wheels are pushed downwards without pulling the low-μ wheels upwards. In another embodiment the low-μ wheels are pulled upwards without pushing the high-μ wheels downwards. However, the illustrated embodiment in which high-μ wheels are pushed downwards while low-μ wheels are pulled upwards provides more control.

The force request for the pushing/pulling may comprise a steady state deflection and may optionally comprise an additional oscillating force request. On some surfaces oscillation against vehicle body inertia can provide momentary increases in normal force $F_N$ to further assist traction. Examples of oscillation are described later.

In an alternative embodiment the normal force of just one wheel is increased, such as the illustrated front right wheel FR or rear left wheel RL.

Figure 8C:
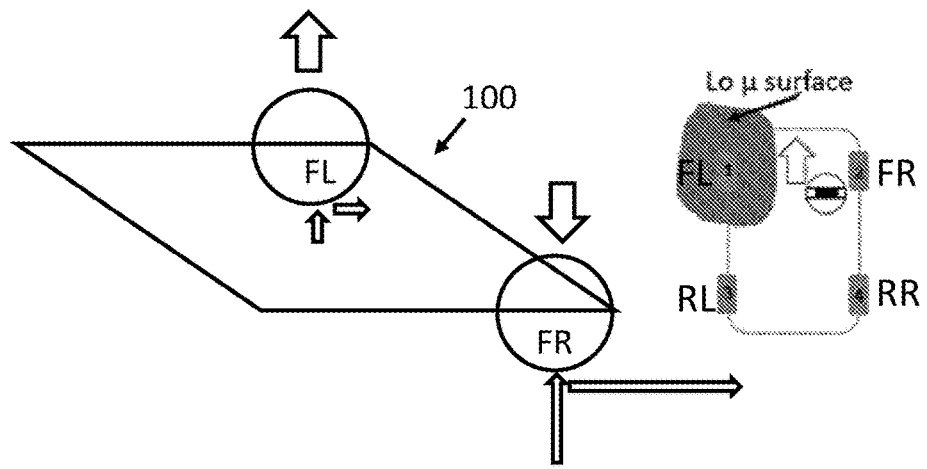

FIG. 8C illustrates a scenario in which only the front left wheel FL encounters a low-μ surface wherein the other wheels FR, RL, RR are on a high-μ surface. In FIG. 8C the front left wheel FL is pulled upward. Any one or more of the high-μ driven wheels can be pushed downward, in this case the front right wheel FR.

Figure 8D:
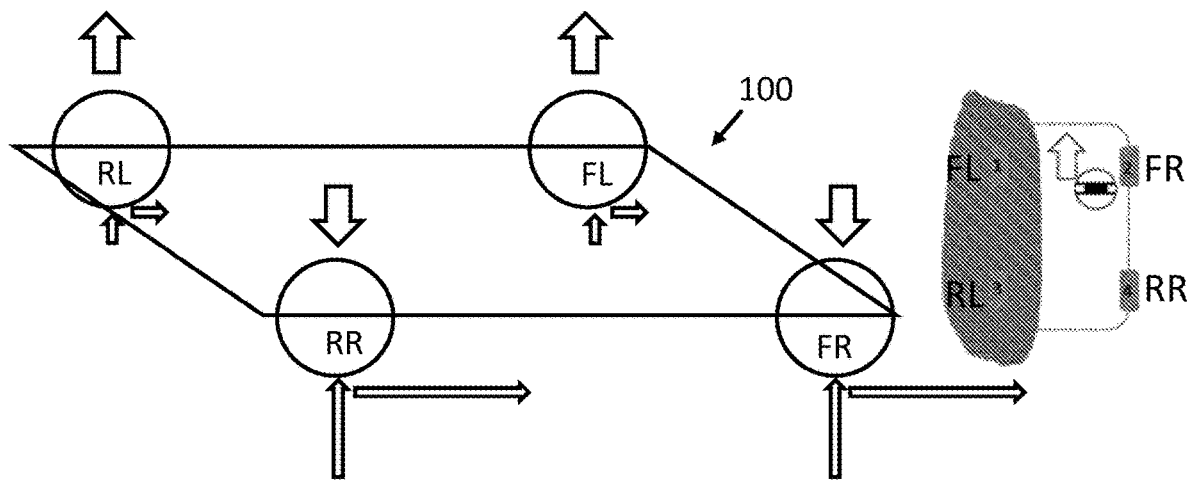

FIG. 8D illustrates a split-μ scenario in which the vehicle 100 is on a road surface with left-right asymmetrical p, in this case wherein the front left and rear left wheels FL, RL encounter a low-μ surface and the front right and rear right wheels FR, RR are on a high-μ surface. If the approach of FIG. 8B is used, adding normal force to the front right wheel FR could reduce contact patch force on the rear right wheel RR, thus mitigating the improvement in resultant propulsive force. Therefore, changing the centre of gravity by 'leaning' the vehicle 100 to the right would be a way to still get an improvement in available tractive force.

Consequently, FIG. 8D shows the right wheels FR, RR being pushed and the left wheels FL, RL being pulled. If the low p surface was to the right side instead, the left wheels FL, RL would be pushed and the right wheels FR, RR pulled.

FIGS. 8C and 8D can result in yawing of the vehicle due to the different traction across lateral wheels. In some examples the control system 300 can monitor yaw signals from the body accelerometer 522 to determine whether a yaw limit is exceeded. The control system 300 can control the force requests to reduce the difference in normal force (and therefore tractive force) between left and right wheels in dependence on the yaw limit being reached.

Figure 8E:
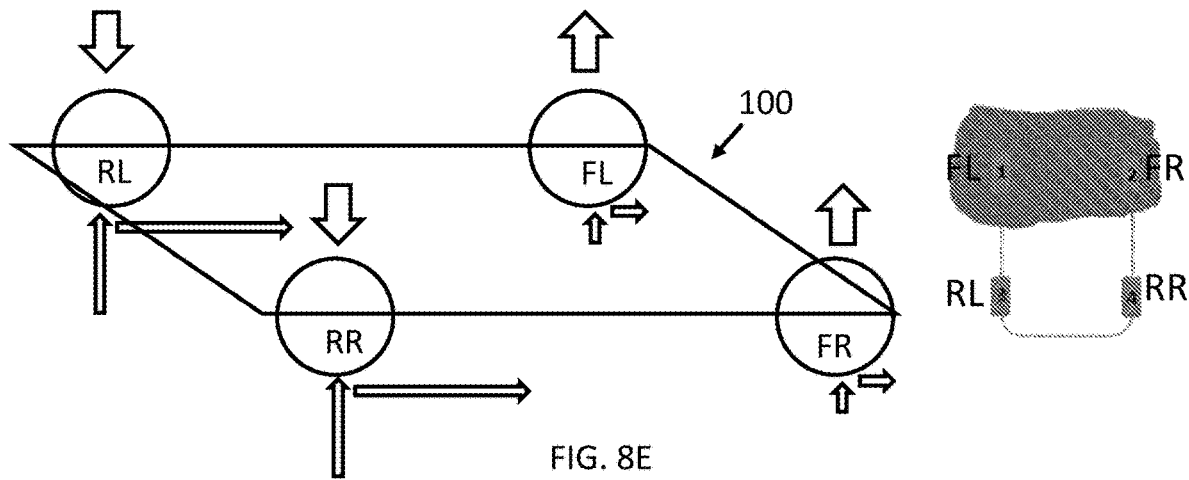

FIG. 8E illustrates another split-μ scenario in which the vehicle 100 is on a road surface with front-rear asymmetrical μ, in this case wherein the front left and front right wheels FL, FR encounter a low-μ surface and the rear left and rear right wheels RL, RR are on a high-μ surface.

Consequently, FIG. 8E shows the rear wheels RL, RR being pushed downwards and the front wheels FL, FR being pulled upwards. The resulting pitch change shifts more weight onto the high-μ rear wheels RL, RR.

FIG. 9 is a flowchart illustrating an example control method 900 for traction finder, implemented by the control system 300.

The method 900 starts at operation 902 in which the method 900 is enabled. Enabling the method 900 may optionally require that one or more inhibit conditions are not active, dependent on one or more of:

vehicle braking. For example, the method 900 may not be enabled while a brake pedal is depressed and/or while braking is greater than a threshold.

vehicle speed. For example, the method 900 may not be enabled while the vehicle 100 is travelling faster than a threshold speed, the threshold speed having a value between approximately 5 m/s and approximately 20 m/s.

A vehicle stability system intervention inhibit condition.

A manually configurable enable/disable setting via HMI 520.

A failure or inhibit signal from a controller of the active suspension system 104, for example indicating a failure condition or excessive temperature.

Surface information as described below.

A blend function associated with the speed-based inhibit condition could allow the amplitudes of the force requests to increase as vehicle speed falls and could decrease the amplitudes as vehicle speed rises, to avoid noticeable binary behaviour. The blend function can have the threshold speed as its upper limit and can have a lower limit speed below which the method 900 is fully enabled. In an example, the lower limit is between 1 metre per second and 10 metres per second slower than the upper limit.

An example inhibit condition based on surface information checks surface information data block 904. The surface information may comprise a selected terrain mode and/or information from one or more sensors from data block 910. Terrain modes are defined at the end of the specification. In an example the method 900 may determine whether the vehicle 100 is in a first terrain mode or a second terrain mode. If the vehicle 100 is in a first terrain mode the method 900 does not proceed. If the vehicle 100 is in a second terrain mode the method 900 proceeds. In one embodiment the first terrain mode is an on-road mode and the second terrain mode is an off-road mode.

At operation 906 a trigger condition is satisfied for starting the estimation phase. In an example, the trigger condition is based on receiving an indication of loss of traction of the vehicle 100, for example wheel slip above a threshold or vehicle speed deviating from a speed setpoint. The loss of traction could be global or limited to one or more individual wheels.

Additionally, or alternatively, the trigger condition can require determination of a deviation of vehicle progress from expected vehicle progress. Determining a deviation from expected progress can comprise receiving feedback indicative of expected vehicle progress. If the vehicle is being manually driven, the feedback can indicate a measured magnitude and/or rate of change of driver-requested braking relative to a threshold and/or can indicate a measured magnitude and/or rate of change of driver-requested torque relative to a threshold. This is because excessive driver use of a brake/accelerator can indicate driver dissatisfaction with a current rate of progress. If the vehicle is being autonomously driven, the feedback can indicate deviation of vehicle speed from a speed setpoint.

The above example is reactive. In some examples a pre-emptive check can be performed in addition to or instead of the reactive trigger. An example pre-emptive check comprises evaluating surface information from one or more sensors configured to detect a deformable/granular surface, such as a radar sensor, a lidar sensor, an ultrasonic sensor or a visual light camera.

In some examples the triggering of the estimation phase depends on driver intent. The trigger condition may further require an indication of intended vehicle motion (e.g. torque request above a threshold and/or speed setpoint in place).

At operation 908 the estimation phase is performed. In an example implementation the control system 300 starts with a first approximation based on wheel slip estimation, and then pulses the wheels as described in relation to FIGS. 6A to 7E to provide additional confidence.

At operation 908 the characteristics (amplitude/frequency) of the pulsation pattern for the estimation phase are determined. This optional operation is useful if one or more pulsation characteristics are to be calculated based on contextual information such as sensor information from data block 910.

In an example, global and local characteristics of the pulsation pattern are determined. Global characteristics govern a common amplitude and frequency target for all wheels. Local characteristics modify the force request for individual corners, to compensate for differences in suspension characteristics.

When calculating the local characteristics for individual corners, various differences between the corners may be taken into account. The suspensions of individual corners have a natural frequency which depends on the stiffnesses of deformable elements such as actuators 502, springs and tyres, and also depends on the sprung mass onto the wheel which varies between corners. While left-to-right differences may be minimal, front-to-rear differences may exist. The rear suspension may have a higher frequency than front suspension, for improving vehicle body composure at speed.

Therefore, the force request to each corner may require a force request frequency not necessarily matching the natural frequency of each corner, to ensure that the resulting frequency of pulsation from the wheel perspective is the same at different corners of the vehicle 100.

Accordingly, one or more variables may be taken into account when determining the force requests for individual corners (individual actuators 502).

Firstly, sprung mass could be measured for a given corner. One method of measuring sprung mass is to measure steady-state pneumatic pressure/hydraulic pressure in the actuator 502 or spring 504, which is a function of weight.

Secondly, as wheel rate may be affected by ride height, a ride height-dependent parameter may be taken into account. In an example, the ride height-dependent parameter comprises is a requested ride height or measured ride height (e.g. measured by wheel-to-body displacement sensors 514).

Thirdly, tyre pressure monitoring data from the TMPS 524 could be employed, to account for any deflation of the tyres and resulting reduction of natural frequency. This is useful in case the driver has let some air out of their tyres to aid progress. Tyre pressure indications for each tyre may be received by the control system 300. A tyre pressure gain function may compensate for differences in tyre pressure between different tyres, to ensure the resulting waveforms are as shown in FIG. 6C or 7E.

Once the estimation phase is completed, the implementation phase is performed at operation 912. The description of FIGS. 8B-8E provides examples of how the implementation phase could be performed. Estimation and implementation may not happen concurrently.

Optionally, the implementation phase may not be performed for one or more scenarios. For example, the split-μ scenarios of one or both of FIGS. 8D-8E may be excluded because the required displacements result in perceptible vehicle body roll or pitch. Only the scenarios that enable diagonal pushing/pulling may be enabled. Therefore, the control system 300 may determine whether to perform the implementation phase in dependence on the pattern of the relative traction levels.

If the pushing/pulling of the wheels comprises a pulsating/oscillating component, the required frequency of the force requests may be calculated using a similar technique as described for operation 908.

In an implementation, steady state displacement might be advantageous for one surface type or distribution of p across different wheels (FIGS. 8B-8E), whereas oscillation might be better when on firmer surfaces. Different surfaces will behave in different ways when reacting to vehicle weight forces (e.g. Newtonian vs. non-Newtonian surfaces, or particulate surfaces vs. solid homogeneous).

In some examples, different frequencies of oscillation may be appropriate for different types of surface or distributions of p across different wheels. Different terrain modes may benefit from different frequencies. For example, a sand-related terrain mode could benefit from multiple superimposed frequencies (0.25-3 Hz and 8-15 Hz) to help tamp down loose sand, whereas another terrain mode associated with hard surfaces may benefit from only a low frequency (0.25-3 Hz).

Therefore, a decision of whether to use steady state displacement or oscillation, or the extent of a blend between the two, may be determined with reference to surface information as described herein.

A frequency may be static or swept within a range. In some examples a combined steady state displacement and oscillation is used, wherein the oscillation is either configured to further increase available traction as described, or is a dither/noise to reduce perception of the steady state displacement.

In some examples in which steady state displacement is employed, if a wheel is already highly articulated (close to vehicle body 102 or close to full droop), an oscillation (e.g. 8-12 Hz) may be used instead for at least that wheel. This ensures that some wheel travel remains and that the required force request is not consistently too high.

In some examples, different frequencies of oscillation may be appropriate if the vehicle 100 is stuck or not stuck. A stuck vehicle 100 may benefit from a higher wheel hop frequency (8-15 Hz), whereas a low frequency (0.25-3 Hz) or both frequencies is suitable for moving vehicles. The vehicle 100 can be determined to be stuck when vehicle speed and/or wheel speed falls below a threshold despite a torque request (e.g. torque request above a threshold). Detected loss of traction (wheel spin) could provide additional confidence that the vehicle 100 is stuck.

A blend function could be implemented to provide a nonbinary transition (e.g. smooth/stepped) between a stuck vehicle strategy and a non-stuck vehicle strategy, or between surface-dependent strategies. Therefore, a strategy change is less perceptible to vehicle occupants. Additionally or alternatively, hysteresis could be implemented for the strategy changes.

During the implementation phase, if the vehicle is moving and not stuck, the control system 300 may optionally determine where the front/leading wheel slipped and therefore pre-emptively prepare the rear/trailing wheel for that low-μ surface before the rear wheel arrives at the low-μ surface. The preparation could shift more weight onto the rear wheel or wheels. The timing of the pre-emptive shift could be based on known vehicle speed and wheelbase. In some examples, shifting the weight comprises at least temporarily modifying the frequency of the oscillation pattern. In some examples, shifting the weight comprises at least temporarily modifying steady-state force requests for each wheel.

During the implementation phase and/or the estimation phase, the control system 300 may use information from the vehicle body accelerometer 522 (e.g. IMU) to ensure that a maximum roll angle threshold and/or pitch angle threshold is not exceeded, and terminate or reduce the pushing/pulling displacements if a threshold is exceeded. This helps when on slopes.

Optionally, traction finder not only uses the active suspension system 104 but also controls one or more other vehicle subsystems to help find traction.

In operation 914 for example, the method 900 controls the torque source 103 to rotate wheels of the vehicle 100 at different speeds and/or rates of change in dependence on the results of the estimation phase. An example implementation is pulsed wheel rotation and/or slow wheel rotation. Slow rotation can compact loose material under the wheel rather than dispersing it in front of or behind the wheel. Pulsing a wheel between static and moving can help to find traction because friction at low slip rates is higher. The wheel speed can be maintained within a target recovery speed range, e.g. corresponding to a vehicle speed ≤1 km/h or ≤5 km/h. Operation 914 could be performed for particular surfaces such as sand (e.g. sand terrain mode) but not other surfaces, e.g. in dependence on surface information.

In operation 916 for example, the method 900 varies a steering angle at one or more steerable wheels in dependence on the information indicative of relative traction levels. This is applicable when the vehicle 100 is moving forwards. Varying the steering angle may comprise sawing the steering angle from left to right, to help the wheel to find traction. An electronic power-assisted steering system (EPAS) has the relevant actuator to perform this operation.

In some examples the EPAS can help with assessment of relative traction levels between steerable wheels (e.g. FL, FR). The control system may measure the torque of a power-assisted steering motor of the EPAS while one of the steerable wheels is unloaded and then measure the torque while the other of the steerable wheels is unloaded.

Operation 916 could be performed for particular surfaces such as non-grass surfaces, e.g. in dependence on surface information. For example, operation 916 can be disabled in a terrain mode that is optimised for grass (e.g. grass-gravel-snow mode, GGS), where such sawing of the steered wheels may cause excessive disturbance of the prevailing surface, leading to unwanted trail erosion and ultimately reducing grip for subsequent vehicle traffic.

The implementation phase (operations 912 and optionally 914 and/or 916) may continue until an exit condition is satisfied. An example exit condition is based on the same sensed information as the trigger condition: an indication of a loss of traction of the vehicle 100 is no longer received or is below a threshold. As long as the vehicle 100 is making forward progress in the intended direction, another estimation phase may not be needed.

In some examples, an exit condition may comprise a determination that the vehicle 100 is stopping or braking. When the exit condition is satisfied, the method 900 may loop back to before operation 906.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

Terrain modes are defined. Different terrain modes control one or more vehicle subsystems according to different sets of configurations. A terrain mode generally refers to vehicle modes optimized for driving over particular driving surfaces. An example of a terrain mode is an off-road terrain mode, arranged to optimize the vehicle 100 for driving over off-road terrain such as may be required when traversing areas of grass, gravel, sand, mud or even crawling over rocks. Another example of a terrain mode is a surface vehicle optimization mode, arranged to optimize the vehicle 100 for driving over low friction surfaces such as snow or ice covered surfaces, either on or off road. A vehicle 100 may comprise a base on-road mode and/or a base surface vehicle optimization mode for regular surfaces, and may comprise a plurality of terrain modes for various surfaces and/or terrain.

A terrain mode and/or detection of a particular terrain type may configure one or more surface traction-related configurations such as a differential locking setting and/or a traction control setting. Additionally, or alternatively, other configurations could be adjusted such as: a suspension setting; a ride height setting; a suspension damper setting; a throttle response setting; a gear shift point setting; locking/lockable differential setting; a vehicle braking or traction control setting; a torque distribution setting; a torque shaping setting; or a steering weighting setting. The configurations may be predetermined or reconfigurable.

A manual user selection may comprise use of a human-machine interface input device 520. In some examples, a terrain mode may be changeable automatically.

One example HMI 520 is a terrain mode selector. In some embodiments, the terrain mode selector may be configured to allow a user to provide surface information by selecting from one a plurality of terrain modes including at least some of: sand; rock-crawl; grass-gravel-snow; mud-ruts; general (base mode).

In some embodiments, the terrain mode selector may be configured to allow a user to select an 'automatic' or 'auto' mode in which the vehicle 100, for example at control system 300, determines the most appropriate terrain mode at a given moment in time. This is achieved by obtaining from one or more sensors surface information including at least some of: rolling resistance; terrain roughness; gradient; wheel slip; wheel articulation; vehicle yaw. Suitable sensors include IMUs/accelerometers 522; 516, wheel speed sensors 512 or the like.

It will be appreciated that various changes and modifications can be made to the present invention without departing from the scope of the present application.

The blocks illustrated in the FIG. 9 may represent steps in a method and/or sections of code in the computer program 308. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant reserves the right to claim protection in respect of any patentable feature or combination of features hereinbefore referred to and/or shown in the drawings whether or not particular emphasis has been placed thereon.

The invention claimed is:

1. A control system for controlling an active suspension system of a vehicle, the control system comprising at least one controller, wherein the control system is configured to:
   obtain information indicative of relative traction levels between different wheels of the vehicle, including identification of a wheel of the vehicle having a relative highest traction compared to the other wheels of the vehicle and identification of a wheel of the vehicle having a relative lowest traction compared to the other wheels of the vehicle; and
   in dependence on the information, control the active suspension system to increase normal force through the wheel of the vehicle having the relative highest traction, and decrease normal force through the wheel of the vehicle having the relative lowest traction.

2. The control system of claim 1, configured to:
   receive an indication of a loss of traction of the vehicle; and
   obtain the information indicative of relative traction levels in response to the indication of the loss of traction.

3. The control system of claim 1, wherein the control system is configured to obtain the information indicative of relative traction levels by:
   controlling the active suspension system to change normal force through a first subset of at least one wheel;
   determining a traction-dependent variable at the at least one wheel of the first subset to which known torque is applied;
   controlling the active suspension system to change normal force through a second subset of at least one wheel; and
   determining a traction-dependent variable at the at least one wheel of the second subset to which known torque is applied,
   wherein the traction-dependent variables indicate relative traction levels.

4. The control system of claim 3, wherein the traction-dependent variables comprise wheel speed.

5. The control system of claim 3, wherein
   the first subset comprises wheels at first diagonally-opposite corners of the vehicle, and
   the second subset comprises wheels at second diagonally-opposite corners of the vehicle.

6. The control system of claim 3, wherein
   the first subset is a first wheel at a first corner of the vehicle; and
   the second subset is a second wheel at a second, adjacent corner of the vehicle.

7. The control system of claim 6, wherein
   the first corner is at a first lateral side of the vehicle and at a first longitudinal end of the vehicle, and
   the second corner is at a second lateral side of the vehicle and at the first longitudinal end.

8. The control system of claim 7, wherein the control system is configured to obtain the information indicative of relative traction levels by:
   controlling the active suspension system to change normal force through a third wheel at the second lateral side and at a second longitudinal end of the vehicle;
   determining a traction-dependent variable at the third wheel to which known torque is applied;
   controlling the active suspension system to change normal force through a fourth wheel at the first lateral side and at the second longitudinal end; and
   determining a traction-dependent variable at the fourth wheel to which known torque is applied,
   wherein the traction-dependent variables at the third and fourth wheels indicate relative traction levels.

9. The control system of claim 3, wherein controlling the active suspension system to change normal force comprises repetitively pulsing normal force through the first subset at a first phase and through the second subset at a second phase.

10. The control system of claim 3, wherein controlling the active suspension system to change normal force comprises repetitively pulsing normal force at a rate between approximately 0.25 Hz and approximately 15 Hz.

11. The control system of claim 1, wherein the control system is configured to control the active suspension system by
   increasing normal force through wheels at first diagonally-opposite corners of the vehicle, including the wheel having relatively high traction; and decreasing normal force through wheels at second diagonally-opposite corners of the vehicle, including the wheel having relatively low traction.

12. The control system of claim 1, wherein the increase of normal force comprises a steady state increase of normal force.

13. The control system of claim 1, wherein controlling the active suspension system in dependence on the information indicative of relative traction levels is continued until an indication of a loss of traction of the vehicle is no longer received or is below a threshold.

14. The control system of claim 1, configured to control at least one of a torque source and braking to rotate wheels of the vehicle differently in dependence on the information indicative of relative traction levels.

15. The control system of claim 1, configured to vary a steering angle at one or more steerable wheels in dependence on the information indicative of relative traction levels.

16. The control system of claim 1, configured to receive surface information, and in dependence on the surface information:

enable the control system to obtain the information indicative of relative traction levels;

enable the control of the active suspension system in dependence on the information indicative of relative traction levels; and determine one or more pulsation characteristics for the control of the active suspension system.

17. An active suspension system comprising the control system of claim 1.

18. A vehicle comprising the control system of claim 1.

19. A method of controlling an active suspension system of a vehicle, the method comprising:

obtaining information indicative of relative traction levels between different wheels of the vehicle, including identifying a wheel of the vehicle having a relative highest traction compared to the other wheels of the vehicle and identifying a wheel of the vehicle having a relative lowest traction compared to the other wheels of the vehicle; and in dependence on the information, controlling the active suspension system to increase normal force through the wheel of the vehicle having the relative highest traction and decrease normal force through the wheel of the vehicle having the relative lowest traction.

20. A non-transitory storage medium containing instructions that, when executed by at least one processor, cause the at least one processor to perform the method of claim 19.

* * * * *